United States Patent
Sood et al.

(10) Patent No.: US 9,639,246 B2
(45) Date of Patent: *May 2, 2017

(54) SEAMLESS PLAYBACK OF COMPOSITE MEDIA

(71) Applicant: MICROSOFT TECHNOLOGY LICENSING, LLC., Redmond, WA (US)

(72) Inventors: Vishal Sood, Bothell, WA (US); Jack E. Freelander, Monroe, WA (US); Jason R. Suess, Seattle, WA (US); Lin Liu, Sammamish, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 514 days.

This patent is subject to a terminal disclaimer.

(21) Appl. No.: 14/179,817

(22) Filed: Feb. 13, 2014

(65) Prior Publication Data

US 2014/0164926 A1 Jun. 12, 2014

Related U.S. Application Data

(63) Continuation of application No. 12/796,677, filed on Jun. 9, 2010, now Pat. No. 8,683,337.

(51) Int. Cl.
*H04N 21/6587* (2011.01)
*H04N 21/262* (2011.01)
(Continued)

(52) U.S. Cl.
CPC ............ *G06F 3/0484* (2013.01); *G11B 27/34* (2013.01); *H04N 21/26258* (2013.01); *H04N 21/6587* (2013.01); *H04N 21/8456* (2013.01)

(58) Field of Classification Search
CPC ..... G11B 27/031; G06F 3/0484; H04L 9/321; H04N 21/234318; H04N 21/26258; H04N 21/8456
See application file for complete search history.

(56) References Cited

U.S. PATENT DOCUMENTS 8,113,844 B2 * 2/2012 Huang .................... G09B 9/00
434/219
8,169,916 B1 * 5/2012 Pai ..................... H04N 21/2181
370/236
(Continued)

OTHER PUBLICATIONS

Sood, Vishal, "Composite Manifest Support for Rough Cut Editing Scenarios in SSME", Retrieved at <<http://blogs.iis.net/vsood/archive/2010/01/22/composite-manifest-support-for-rough-cut-editing-scenarios-in-ssme.aspx>>, Jan. 22, 2010, 4 Pages.
(Continued)

*Primary Examiner* — Andrew Tank

(57) ABSTRACT

A streaming composition system is described herein that provides easy workflow and playback capabilities for content producers to create composite media assets from existing and on-going media content and for streaming clients to seamlessly playback composite multimedia streams provided from different sources. These assets provide broadcasters an option to quickly turn around highlights for an on-going event. The streaming composition system allows a producer to identify clips within existing media assets and compose the clips into a new unified streaming presentation. For producers that already have smooth streaming media assets, the system leverages these assets to provide seamless playback across clip boundaries including advanced playback support for advertisement insertion, fast forward, rewind, and so on.

14 Claims, 4 Drawing Sheets

(51) Int. Cl.
*H04N 21/845* (2011.01)
*G06F 3/0484* (2013.01)
*G11B 27/34* (2006.01)

(56) References Cited

U.S. PATENT DOCUMENTS

| | | | |
|---|---|---|---|
| 2002/0103919 A1 | 8/2002 | Hannaway | |
| 2005/0123136 A1* | 6/2005 | Shin | G11B 20/00086 380/217 |
| 2005/0183120 A1* | 8/2005 | Jain | H04N 7/17336 725/46 |
| 2005/0244005 A1 | 11/2005 | Grigorovitch et al. | |
| 2008/0074486 A1 | 3/2008 | Robinson | |
| 2008/0133766 A1* | 6/2008 | Luo | H04L 47/10 709/231 |
| 2008/0147700 A1* | 6/2008 | Doi | G11B 27/034 |
| 2009/0119730 A1 | 5/2009 | Perlman et al. | |
| 2010/0281381 A1* | 11/2010 | Meaney | G11B 27/031 715/723 |

OTHER PUBLICATIONS

Jadib, Ezequiel, "Archive for the 'Rough Cut Editing' Category", Retrieved at <<http://blogs.southworks.net/ejadib/category/rough-cut-editing/>>, Feb. 5, 2010, 6 Pages.

Sood, Vishal, "IIS Smooth Streaming Player Development Kit Beta 2 Released", Retrieved at <<http://blogs.iis.net/vsood/archive/2010/01/15/iis-smooth-streaming-player-development-kit-beta-2-released.aspx>>, Jan. 15, 2010, 5 Pages.

"Timeline Markers and Events (IIS Smooth Streaming)", Retrieved at <<http://msdn.microsoft.com/en-us/library/ee958034.aspx>>, Retrieved Date: Feb. 8, 2010, 7 Pages.

"Non-Final Office Action Issued in U.S. Appl. No. 12/796,677", Mailed Date: Sep. 26, 2012, 18 pages.

"Final Office Action Issued in U.S. Appl. No. 12/796,677", Mailed Date: Jun. 21, 2013, 24 pages.

"Notice of Allowance Issued in U.S. Appl. No. 12/796,677", Mailed Date: Nov. 4, 2013, 9 pages.

* cited by examiner

SEAMLESS PLAYBACK OF COMPOSITE MEDIA

CROSS REFERENCE TO RELATED APPLICATIONS

This is a continuation application of application Ser. No. 12/796,677, filed Jun. 9, 2010, entitled "Seamless Playback of Composite Media", the entirety of which is incorporated herein by reference.

BACKGROUND

Streaming media is multimedia that is constantly received by, and normally presented to, an end-user (using a client) while it is being delivered by a streaming provider (using a server). Several protocols exist for streaming media, including the smooth streaming protocol introduced by MICROSOFT™ Internet Information Server (IIS). Prior to smooth streaming, most streaming media technologies used tight coupling between server and client with a stateful connection. The stateful connection between client and server created additional server overhead (because the server tracked a current state of each client) and limited the scalability of the server.

MICROSOFT™ IIS Smooth Streaming (part of IIS Media Services, referred to herein as smooth streaming) provides stateless communication between the client and server by breaking media up into chunks that are individually addressable and can be individually requested by clients. For a particular media event or content item, the smooth streaming server provides a manifest file that describes each of the chunks that comprise the event. For example, a one-minute video provided by smooth streaming may include 60 one-second audiovisual chunks. Each chunk contains metadata and media content. The metadata may describe useful information about the media content, such as the bit rate of the media content, where the media content fits into a larger media element, a codec used to encode the media content, and so forth. The client uses this information to place the chunk into a storyboard of the larger media element and to properly decode and playback the media content. The chunks can be in any format, such as Motion Picture Experts Group (MPEG) 4 boxes or other containers. A smooth streaming client plays a media event to a user by reading the manifest and regularly requesting chunks from the server. The user may also skip around (e.g., seek, fast forward, rewind) and the client can provide these behaviors by requesting later or earlier chunks described by the manifest. For live events, the server may provide the manifest to the client piecemeal, so that the server informs the client of newly available chunks as they become available.

Each chunk may have its own Uniform Resource Locator (URL), allowing chunks to be cacheable by existing Internet infrastructure. The Internet contains many types of downloadable media content items, including audio, video, documents, and so forth. These content items are often very large, such as video in the hundreds of megabytes. Users often retrieve documents over the Internet using Hypertext Transfer Protocol (HTTP) through a web browser. The Internet has built up a large infrastructure of routers and proxies that are effective at caching data for HTTP. Servers can provide cached data to clients with less delay and by using fewer resources than re-requesting the content from the original source. For example, a user in New York may download a content item served from a host in Japan, and receive the content item through a router in California. If a user in New Jersey requests the same file, the router in California may be able to provide the content item without again requesting the data from the host in Japan. This reduces the network traffic over possibly strained routes, and allows the user in New Jersey to receive the content item with less latency.

While smooth streaming provides a great experience for viewing streaming media over the Internet and other networks, users often want to view (and producers of content often want to provide) content that comes from different sources or from different existing content items. For example, a sports network may want to provide a highlight video at the end of each day that includes some new commentary and some selections from earlier media events. Today the sports network can provide links to each video, but users may not want to view dozens of different video streams or files. Producers of content do not want to re-encode or repackage each earlier content item for release as a new content item for these types of purposes. Only by repackaging the content can the publisher provide the user with familiar smooth streaming controls, such as skipping forward and backward in a stream. In many cases, the producer may want to provide quick turnaround to create highlights using a combination of on-demand and live assets immediately after an event or even as an event is still on-going (e.g., for late joining viewers of the event).

SUMMARY

A streaming composition system is described herein that provides easy workflow and playback capabilities for content producers to create composite media assets from existing and on-going media content and for streaming clients to seamlessly playback composite multimedia streams provided from different sources. These assets provide broadcasters an option to quickly make highlights for an on-going event available. The streaming composition system allows a producer to identify clips within existing media assets and compose the clips into a new unified streaming presentation. For producers that already have smooth streaming media assets, the system reuses these assets to provide seamless playback across clip boundaries including advanced playback support for advertisement insertion, fast forward, rewind, and so on. The system allows having mark-in/mark-out points on one or more video streams to create a composite stream, so that the composite stream can include any portion within the original media assets as well as inserting clips from new media assets. Thus, the streaming composition system provides a straightforward way for content producers to produce a composite presentation from existing media assets and for clients to seamlessly view the composite presentation as if it were a single media presentation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
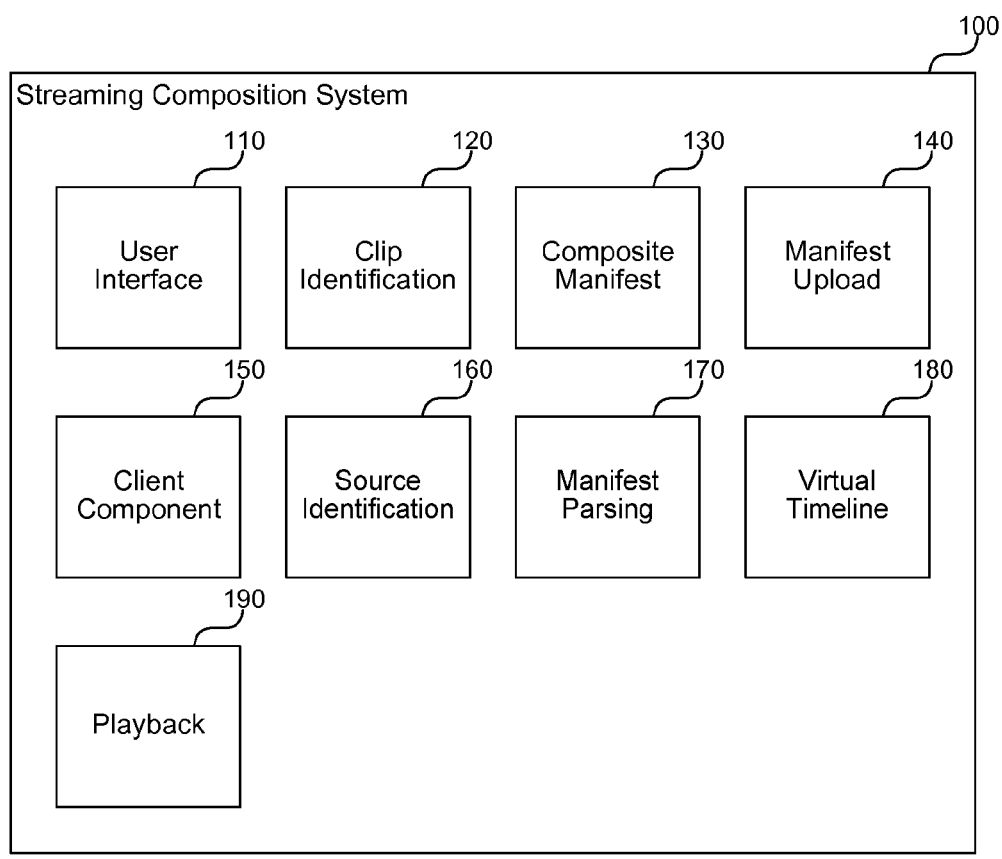
FIG. 1 is a block diagram that illustrates components of the streaming composition system, in one embodiment.

A streaming composition system is described herein that provides easy workflow and playback capabilities for content producers to create composite media assets from existing and on-going media content and for streaming clients to seamlessly playback composite multimedia streams provided from different sources. These assets provide broadcasters an option to quickly turn around highlights for an on-going event (e.g., to attract more customers or provide a quick update to the late joiners). The streaming composition system allows a producer to identify clips within existing media assets and compose the clips into a new unified streaming presentation. For producers that already have smooth streaming media assets, the system leverages these assets to provide seamless playback across clip boundaries including advanced playback support for advertisement insertion, fast forward, rewind, and so on. The system allows having mark-in/mark-out points on one or more video streams to create a composite stream, so that the composite stream can include any portion within the original media assets as well as inserting clips from new media assets (e.g., to provide a commentary or advertisements along with the original media assets).

The system also provides a client component that implements a familiar client application-programming interface (API) that can play and manage composite media streams in a similar manner to prior (non-composite) smooth streaming playback. For example, MICROSOFT™ provides a SILVERLIGHT™ based control (the Smooth Streaming Media Element (SSME) class, part of the IIS Smooth Streaming Client) for playing smooth streaming presentations, which the streaming composition system can modify to provide for playback of composite streams. The composite streams appear as a single stream to the end user. Thus, the streaming composition system provides a straightforward way for content producers to produce composite presentations from existing media assets and for clients to seamlessly view a composite presentation as if it were a single media presentation.

In some embodiments, the streaming composition system defines a composite manifest structure that includes portions of multiple manifests from existing smooth streaming assets. The composite manifest structure adds clips to the smooth streaming manifest, where each clip defines an entry and exit boundary (e.g., a start and end time) into a separate media asset. The composite manifest defines the order and content of each clip. The client component uses the composite manifest to determine which chunks of media data to request from the server. In some embodiments, the client component builds a virtual timeline that includes a total duration determined by adding up the length of all of the clips that make up the composite stream. The client component may display the virtual timeline to the user so that the user can skip within the video and see markers that identify portions of the video (e.g., each touchdown in a football game video clip). In some embodiments, the streaming composition system provides a tool through which a content producer can specify existing assets and create a composite manifest for delivery to clients. The producer uploads the created composite manifest to a web server to which clients refer to find content. The client sets the URL of the web server as a source for playing streaming media, and the client requests media data from the server (or other servers) according to the instructions in the manifest.

FIG. 1 is a block diagram that illustrates components of the streaming composition system, in one embodiment. The system 100 includes a user interface component 110, a clip identification component 120, a composite manifest component 130, a manifest upload component 140, a client component 150, a source identification component 160, a manifest parsing component 170, a virtual timeline component, and a playback component 190. Each of these components is described in further detail herein.

The user interface component 110 provides an interface through which a content producer can select clips for inclusion in a composite media stream. For example, the system may display a graphical user interface (GUI), console user interface (CUI), web page, or other facility for collecting information from the producer identifying media assets and portions of the assets to be incorporated into a composite streaming presentation. In some cases, the producer may use the user interface while an event is still in progress to create clips indicating highlights or other relevant portions of a presentation related to the event. The client may receive an updated manifest based on the producer's addition of new clips.

The clip identification component 120 receives start and stop information about each of multiple clips to be included in the composite media stream. For example, the system may display a list of media assets and a media-playing interface through which the content producer can view the media assets, selecting start and stop times to create a clip, and add the clip to the composite media stream.

The composite manifest component 130 creates a composite manifest that describes the composite media stream, including an identification of each clip that comprises the composite media stream. For example, the component 130 may create an extensible markup language (XML) file or other specification that describes the clips that comprise the composite media stream. Each clip's portion of the manifest may resemble a manifest of a single media presentation, and the composite manifest specifies and orders the clips for seamless playback together, so that the multiple clips appear as one presentation to a viewing user.

The manifest upload component 140 uploads the created composite manifest to a server from which clients can retrieve the manifest. For example, the user interface component 110 may include a publish command that allows the content producer to expose the created composite manifest for viewer consumption. Uploading or publishing may include placing the manifest in a directory or file structure of one or more origin servers. As clients retrieve the composite manifest, the manifest may be present in one or more caches so that additional clients can retrieve the manifest without contacting the original server.

The client component 150 provides a client-side API for playing back composite media streams. The component 150 allows individual websites or applications to customize behavior of the system based on their own purposes, such as to display branding and other content in association with a streaming media presentation. The client component 150 includes functions for setting up playback of a composite media stream, including identifying a source of the stream from which to download the composite manifest, and other options such as a default bit rate. The client component 150 may also include functions for managing a playing stream, such as controls for skipping, rewinding, fast-forwarding, pausing, advancing to bookmarked sections of the stream, and so forth as well as stream/track selection functions to choose other streams related to the current presentation (e.g., streams with captions, multiple audio languages, and so on). The client component 150 allows applications to leverage the system on top of a platform (SILVERLIGHT™) that has no native notion or support for seamless clip-stitching or trick play (e.g., fast-forward and rewind). The client component 150 handles the identification and retrieval of media content into a form that the underlying software platform can handle the same as if it were playing local media content.

The client component 150 may include other subcomponents (not shown), such as a heuristics component, a state management component, and a configuration component. The heuristics component analyzes the success of receiving packets from the server and adapts the client's requests based on a set of current network and other conditions. For example, if the client is routinely receiving media chunks late, then the component determine that the bandwidth between the client and the server is inadequate for the current bit rate, and the client may begin requesting media chunks at a lower bit rate. The state management component manages state information about ongoing playback and provides client applications with consistent state indications. The component allows state management within the SSME class and provides developers an easy way to track the state of the playback without having to understand potentially changing conditions. The configuration component provides an interface through which developers can configure the system 100.

The source identification component 160 identifies a source of the composite media stream, wherein the source provides the composite manifest. For example, a user may select or a web page may incorporate a link to a particular origin server (or servers) that provides the composite manifest. In some cases, the same server may serve the media content, but the content producer can also specify playback of content from other servers within the composite manifest.

The manifest parsing component 170 retrieves the composite manifest, identifies clips specified within the composite manifest, and prepares the clips for playback. The manifest parsing component may navigate an XML or other document that comprises the composite manifest and identify the clips specified within the composite manifest so that other components can prepare for playback. For example, the component 170 may identify the first few chunks to be retrieved to playback the composite stream and begin retrieving the chunks.

The virtual timeline component 180 builds a virtual timeline that spans one or more clips specified by the composite manifest. Because the composite stream is built of multiple clips of varying lengths, the timeline of any particular clip does not reflect the timeline for the composite stream. Users often expect to view the length of playing media content, and to be able to select locations on a playback bar where the locations map to times within the presentation. For example, a user viewing a one-minute presentation may click near a 45-second mark to quickly view the end of the presentation. The virtual timeline component 180 determines a virtual timeline based on the information about each clip in the composite manifest. For example, the component 180 may add up the duration of each clip and include any additional time (e.g., for inserted advertisements that may not be represented as clips) to determine an overall duration of the composite presentation and display a playback bar. For live events or composite presentations that include live clips, the system may provide a default amount of time on a playback bar (e.g., one hour) and periodically update the bar as the presentation continues.

The playback component 190 plays the composite media stream using client hardware. For example, the component 190 may invoke client APIs, such as MICROSOFT™ SILVERLIGHT™ or MICROSOFT™ DirectX APIs for playing back multimedia content using one or more client codecs appropriate for the encoding of each of the clips within the composite media stream. The playback component 190 responds to user controls and invokes the client component 150 and other components to perform any further processing, such as skipping to a new clip based on a user's selections along the virtual timeline and retrieving chunks for the new clip from one or more servers. In some embodiments, the source identification component 160, manifest parsing component 170, manifest parsing component 180, and playback component 190 may be part of or associated with the client component 150 and perform operations on the client to consume composite manifests retrieved from a server.

The computing device on which the streaming composition system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, set top boxes, systems on a chip (SOCs), and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
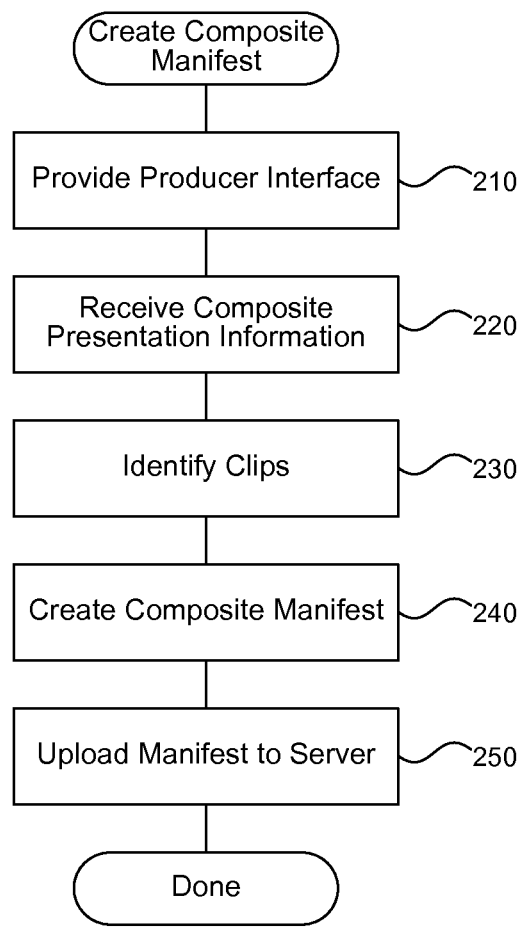
FIG. 2 is a flow diagram that illustrates processing of the streaming composition system to publish a composite media presentation, in one embodiment.

FIG. 2 is a flow diagram that illustrates processing of the streaming composition system to publish a composite media presentation, in one embodiment. Beginning in block 210, the system provides an interface through which a content producer can identify media assets from which to compose clips into a seamless composite media presentation. For example, the system may display a GUI from which the producer can select one or more on-demand or live presentations from which to specify clips. Continuing in block 220, the system receives information identifying one or more clips for the composite media presentation. For example, the producer may successively select one or more previous presentations and identify start and stop times of one or more locations within the previous presentations from which to create clips. For example, the clips may represent highlights of a sporting event.

Continuing in block 230, the system identifies the one or more clips identified by the received information and stores information for playing each identified clip. For example, the system may identify one or more chunks that correspond to the locations in the previous presentation specified by the clip. The system may also identify other information relevant to the clip, such as available and default bit rates, encodings available, supplemental information such as captions, and so forth. Continuing in block 240, the system creates a composite manifest that specifies information about the composite media presentation and each clip associated with the composite media presentation. The manifest allows the client to play clip after clip as a single presentation to the user without asking the user to identify each subsequent item to play. The composite manifest can be an XML file, rows in a database, or any other suitable facility for identifying the clips and an order in which they are to be presented to the client.

Continuing in block 250, the system uploads the created composite manifest to one or more servers for access by clients. For example, the system may copy the composite manifest (e.g., a CSM file) to a web server from which clients can retrieve the manifest at a well-defined URL. The system may also publish the URL, such as on a web page that provides a directory of media assets available from a site (e.g., the front page or sports page of a news site). Note that in many cases, composing the composite manifest may be the only action for the producer to publish a new composite media presentation. The presentation may leverage existing media assets already published and available from one or more servers, and the system provides an easy way for the producer to create new presentations from those assets. After block 250, these steps conclude.

Figure 3:
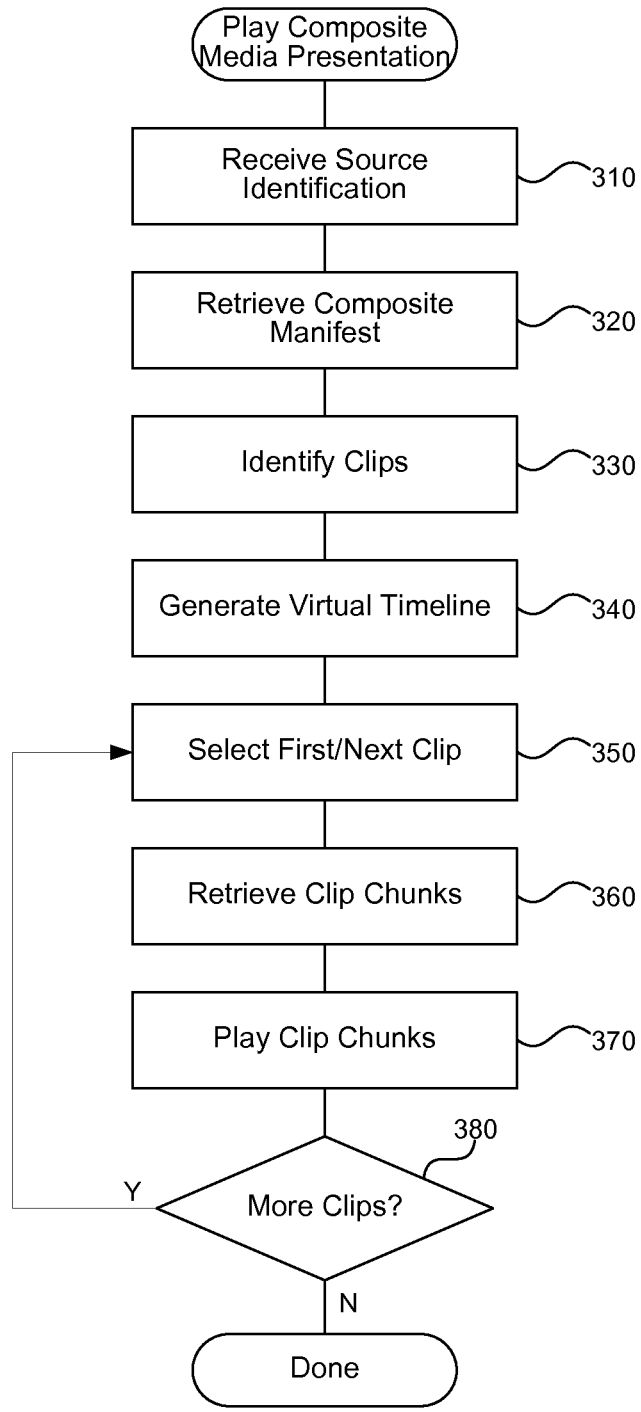
FIG. 3 is a flow diagram that illustrates processing of the streaming composition system to play a composite media presentation, in one embodiment.

FIG. 3 is a flow diagram that illustrates processing of the streaming composition system to play a composite media presentation, in one embodiment. Beginning in block 310, the system receives an identification of a source of the composite media presentation. For example, an application invoked by the user through a web browser may invoke a client API and specify a URL that identifies the composite media presentation. The URL may refer to a location hosted by one or more origin servers and cached by specialized and general-purpose cache servers on a network.

Continuing in block 320, the system retrieves a composite manifest that describes the composite media presentation from the identified source. For example, if the source is identified using a URL, then the system may retrieve the manifest by issuing an HTTP GET request specifying a domain, virtual directory, and file name of the manifest. The system receives the manifest in response, such as via an HTTP 200 OK response with associated data. Continuing in block 330, the system parses the retrieved manifest to identify one or more clips associated with the composite manifest. A composite manifest identifies one or more clips, such as via a hierarchical scheme like that provided by XML. An XML composite manifest file may include a tag for each clip and sub-tags that identify information about the clips, such as smooth streaming media chunks that comprise the clips and a location for retrieving the chunks.

Continuing in block 340, the system generates a virtual timeline that spans multiple clips associated with the composite manifest. For example, the system may determine an overall duration of the composite media presentation based on a duration associated with each clip. In cases where a clip's duration is not known, such as for an ongoing live presentation, the system may contribute an estimate or default amount to the virtual timeline. The virtual timeline allows a viewer of the presentation to seek freely within the composite media presentation seamlessly without knowledge of clip boundaries. Continuing in block 350, the system selects a first identified clip. The system retrieves the clip information from the composite manifest and identifies one or more chunks associated with the clip. The chunk information may contain a URL for retrieving chunks, bitrate information, and other media information. On subsequent iterations, the system selects the next identified clip.

Continuing in block 360, the system retrieves one or more clip chunks associated with the selected clip. For example, the system may issue an HTTP GET request to retrieve a chunk associated with a particular URL specified in the composite manifest. These requests are the same ones made for the original source, allowing the client to potentially receive cached assets from earlier requests, thereby increasing efficiency. The system may receive the chunk from one or more origin servers or from a cache server (e.g., if the clip chunk has been previously requested by other clients). Continuing in block 370, the system plays one or more retrieved clip chunks in order. Each chunk may include an MPEG Group of Pictures (GOP), a frame, or other suitable subdivision of a media presentation for transmission in parts from a server to a client. Although shown serially, the system may continuously retrieve clip chunks and play them back as they become available. These processes may occur in parallel, such as on different threads, and the system may begin retrieving chunks associated with subsequent clips before the selected clip is done playing, such as based on extra available bandwidth. The steps are shown serially herein for ease of illustration, but those of ordinary skill in the art will recognize various modifications and optimizations that can achieve similar results and exhibit other positive qualities.

Continuing decision in block 380, if the system determines that more clips are available in the composite manifest, then the system loops to block 350 to select the next clip, else the system completes. The system continues playing each clip specified in the composite manifest until the end of the composite media presentation. After block 380, these steps conclude.

Figure 4:
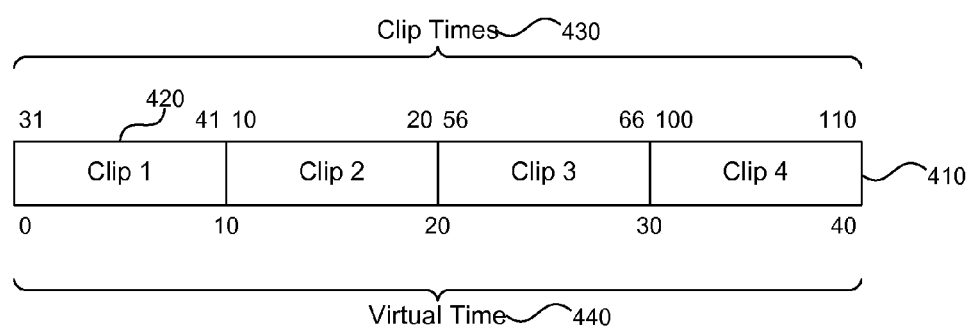
FIG. 4 is a block diagram that illustrates a virtual timeline generated by the streaming composition system, in one embodiment.

FIG. 4 is a block diagram that illustrates a virtual timeline generated by the streaming composition system, in one embodiment. The diagram includes a composite media stream 410 made up of four clips, such as a first clip 420. Each clip identifies clip-based start and end times 430. For example, the first clip starts at 31 units (e.g., seconds) and ends at 41 units. The system maps all of the clips onto a virtual timeline 440 that includes times running from zero until the end of the composite media presentation. The client software can paint the virtual timeline as a playback bar or other control from which the user can seek or select other controls to modify playback of the presentation.

Following is an example of a manifest format specification that illustrates one embodiment of the streaming composition system and the features described herein. It is helpful to start with an example of a current manifest file, such as that provided by MICROSOFT™ Internet Information Server Smooth Streaming.

```xml
<?xml version="1.0" encoding="utf-16" ?>
<!-- Created with Expression Encoder version 3.0.1332.0-->
<SmoothStreamingMedia MajorVersion="2" MinorVersion="0" Duration="300000000">
    <StreamIndex Type="video" Chunks="15" QualityLevels="8" MaxWidth="640" MaxHeight="480" DisplayWidth="640" DisplayHeight="480" Url="QualityLevels({bitrate})/Fragments(video={start time})">
        <QualityLevel Index="0" Bitrate="1644000" FourCC="WVC1" MaxWidth="640" MaxHeight="480" CodecPrivateData="250000010FCBF213F0EF8A13F83BE80C9081B22B6457400000010E5A67F840" />
        <QualityLevel Index="1" Bitrate="1241000" FourCC="WVC1" MaxWidth="640" MaxHeight="480" CodecPrivateData="250000010FCBE613F0EF8A13F83BE80C9081A5DECBBE400000010E5A67F840" />
        <QualityLevel Index="2" Bitrate="937000" FourCC="WVC1" MaxWidth="640" MaxHeight="480" CodecPrivateData="250000010FCBDC13F0EF8A13F83BE80C90811C97F260C00000010E5A67F840" />
        <QualityLevel Index="3" Bitrate="708000" FourCC="WVC1" MaxWidth="428" MaxHeight="320" CodecPrivateData="250000010FCBD60D509F8A0D5827E80C9081159AD66CC00000010E5A67F840" />
        <QualityLevel Index="4" Bitrate="534000" FourCC="WVC1" MaxWidth="428" MaxHeight="320" CodecPrivateData="250000010FCBD00D509F8A0D5827E80C9081104B412F400000010E5A67F840" />
        <QualityLevel Index="5" Bitrate="403000" FourCC="WVC1" MaxWidth="428" MaxHeight="320" CodecPrivateData="250000010FCBCC0D509F8A0D5827E80C90808C4BE263400000010E5A67F840" />
        <QualityLevel Index="6" Bitrate="305000" FourCC="WVC1" MaxWidth="364" MaxHeight="272" CodecPrivateData="250000010FC3C80B50878A0B5821E80C9080894E4A76400000010E5A67F840" />
        <QualityLevel Index="7" Bitrate="230000" FourCC="WVC1" MaxWidth="364" MaxHeight="272" CodecPrivateData="250000010FC3C60B50878A0B5821E80C90800704704DC00000010E5A67F840" />
        <c t="0" />
        <c t="22350000" />
        <c t="42370000" />
        <c t="62390000" />
        <c t="82410000" />
        <c t="102430000" />
        <c t="122450000" />
        <c t="142470000" />
        <c t="162490000" />
        <c t="182510000" />
        <c t="202530000" />
        <c t="222550000" />
        <c t="242570000" />
        <c t="262590000" />
        <c t="282610000" d="17350001" />
    </StreamIndex>
    <StreamIndex Type="audio" Index="0" FourCC="WMAP" Chunks="15" QualityLevels="1" Url="QualityLevels({bitrate})/Fragments(audio={start time})">
        <QualityLevel Bitrate="192000" SamplingRate="44100" Channels="2" BitsPerSample="16" PacketSize="8917" AudioTag="354" CodecPrivateData="1000030000000000000000000000E0000000" />
        <c t="0" />
        <c t="22291156" />
        <c t="40867120" />
        <c t="60371882" />
        <c t="84056235" />
        <c t="100774603" />
        <c t="121208163" />
        <c t="143034920" />
        <c t="160682086" />
        <c t="181580045" />
        <c t="202013605" />
        <c t="221518367" />
        <c t="242880725" />
        <c t="260789115" />
        <c t="282354648" d="17993650" />
    </StreamIndex>
</SmoothStreamingMedia>
```

Each SmoothStreamingMedia element contains one or more StreamIndex elements that specify available streams for the presentation. For example, one stream may represent video data and the other stream may represent audio data. Each StreamIndex element contains one or more QualityLevel elements and 'c' elements. The QualityLevel elements describe one or more available bitrates or other quality types available for the StreamIndex parent. The 'c' elements describe the available chunks of the media presentation, and include a time specification that designates an offset within the overall presentation where the chunk begins. The final chunk may include a total duration.

Applying the streaming composition system to the above example manifest, suppose that a content producer wants to include a clip of the first 10 seconds of the above presentation in a new composite media presentation. This can be represented in a composite manifest as follows (http://abcxyz.com/sample.ism/Manifest points to the URL for the manifest of the original presentation).

```
<?xml version="1.0" encoding="utf-16" ?>
<SmoothStreamingMedia MajorVersion="2" MinorVersion="0"
Duration="200000000">
<Clip Url="http://abcxyz.com/sample.ism/Manifest" ClipBegin="0"
ClipEnd="100000000">
    <StreamIndex Type="video" Chunks="5" QualityLevels="8" MaxWidth="640"
MaxHeight="480" DisplayWidth="640" DisplayHeight="480"
Url="QualityLevels({bitrate})/Fragments(video={start time})">
        <QualityLevel Index="0" Bitrate="1644000" FourCC="WVC1"
MaxWidth="640" MaxHeight="480"
CodecPrivateData="250000010FCBF213F0EF8A13F83BE80C9081B22B6457400000010
E5A67F840" />
        <QualityLevel Index="1" Bitrate="1241000" FourCC="WVC1"
MaxWidth="640" MaxHeight="480"
CodecPrivateData="250000010FCBE613F0EF8A13F83BE80C9081A5DECBBE400000010
E5A67F840" />
        <QualityLevel Index="2" Bitrate="937000" FourCC="WVC1"
MaxWidth="640" MaxHeight="480"
CodecPrivateData="250000010FCBDC13F0EF8A13F83BE80C90811C97F260C00000010
E5A67F840" />
        <QualityLevel Index="3" Bitrate="708000" FourCC="WVC1"
MaxWidth="428" MaxHeight="320"
CodecPrivateData="250000010FCBD60D509F8A0D5827E80C9081159AD66CC00000010
E5A67F840" />
        <QualityLevel Index="4" Bitrate="534000" FourCC="WVC1"
MaxWidth="428" MaxHeight="320"
CodecPrivateData="250000010FCBD00D509F8A0D5827E80C9081104B412F400000010
E5A67F840" />
        <QualityLevel Index="5" Bitrate="403000" FourCC="WVC1"
MaxWidth="428" MaxHeight="320"
CodecPrivateData="250000010FCBCC0D509F8A0D5827E80C90808C4BE263400000010
E5A67F840" />
        <QualityLevel Index="6" Bitrate="305000" FourCC="WVC1"
MaxWidth="364" MaxHeight="272"
CodecPrivateData="250000010FC3C80B50878A0B5821E80C9080894E4A76400000010
E5A67F840" />
        <QualityLevel Index="7" Bitrate="230000" FourCC="WVC1"
MaxWidth="364" MaxHeight="272"
CodecPrivateData="250000010FC3C60B50878A0B5821E80C90800704704DC00000010
E5A67F840" />
        <c t="0" />
        <c t="22350000" />
        <c t="42370000" />
        <c t="62390000" />
        <c t="82410000" d="20020000" />
    </StreamIndex>
    <StreamIndex Type="audio" Index="0" FourCC="WMAP" Chunks="5"
QualityLevels="1" Url="QualityLevels({bitrate})/Fragments(audio={start
time})">
        <QualityLevel Bitrate="192000" SamplingRate="44100" Channels="2"
BitsPerSample="16" PacketSize="8917" AudioTag="354"
CodecPrivateData="1000030000000000000000000000E0000000" />
        <c t="0" />
        <c t="22291156" />
        <c t="40867120" />
        <c t="60371882" />
        <c t="84056235" d="16718368" />
    </StreamIndex>
</Clip>
</SmoothStreamingMedia>
```

Note that in this example implementation, the difference is that SmoothStreamingMedia elements now contain a new Clip element. Each Clip element contains StreamIndex elements and their child elements as before. The Clip element has attributes called Url, ClipBegin, and ClipEnd. The Url attribute specifies the URL to the original source manifest from which these clips were cut. The value is similar to what a programmer or application would set on the SmoothStreamingSource property in a Smooth Streaming Media Element using MICROSOFT™ SILVERLIGHT™

(e.g., http://abcxyz.com/sample.ism/Manifest). The ClipBegin attribute specifies a time in nanoseconds at which to begin the playback for the clip. The ClipEnd attribute specifies a time in nanoseconds at which to end the playback for the clip.

The 'c' elements are still present in this composite manifest so that this manifest is self-sufficient for playing the composite media presentation (although other embodiments could rely on the client retrieving the original manifest to play the clips), without downloading the source manifest. Not all 'c' elements are included in this manifest, as the composite manifest can avoid including chunks of the source presentation that are not within the clip boundaries. In this case, times are close to the ClipBegin and ClipEnd. They may not exactly match in timestamps as chunks may have one granularity (e.g., two seconds) while the clip is cut at a finer granularity (e.g., one second). The client can handle playing portions of chunks based on the clip times.

The previous example illustrated how to compose a single clip. The following example expands this to multiple such clips stitched together. Following is an example manifest for two clips.

```xml
<?xml version="1.0" encoding="utf-16"?>
<SmoothStreamingMedia MajorVersion="2" MinorVersion="0" Duration="200000000">
    <Clip Url="http://abcxyz.com/sample.ism/Manifest" ClipBegin="0" ClipEnd="100000000">
        <StreamIndex Type="video" Chunks="5" QualityLevels="8" MaxWidth="640" MaxHeight="480" DisplayWidth="640" DisplayHeight="480" Url="QualityLevels({bitrate})/Fragments(video={start time})">
            <QualityLevel Index="0" Bitrate="1644000" FourCC="WVC1" MaxWidth="640" MaxHeight="480" CodecPrivateData="250000010FCBF213F0EF8A13F83BE80C9081B22B6457400000010E5A67F840" />
            <QualityLevel Index="1" Bitrate="1241000" FourCC="WVC1" MaxWidth="640" MaxHeight="480" CodecPrivateData="250000010FCBE613F0EF8A13F83BE80C9081A5DECBBE400000010E5A67F840" />
            <QualityLevel Index="2" Bitrate="937000" FourCC="WVC1" MaxWidth="640" MaxHeight="480" CodecPrivateData="250000010FCBDC13F0EF8A13F83BE80C90811C97F260C00000010E5A67F840" />
            <QualityLevel Index="3" Bitrate="708000" FourCC="WVC1" MaxWidth="428" MaxHeight="320" CodecPrivateData="250000010FCBD60D509F8A0D5827E80C9081159AD66CC00000010E5A67F840" />
            <QualityLevel Index="4" Bitrate="534000" FourCC="WVC1" MaxWidth="428" MaxHeight="320" CodecPrivateData="250000010FCBD00D509F8A0D5827E80C9081104B412F400000010E5A67F840" />
            <QualityLevel Index="5" Bitrate="403000" FourCC="WVC1" MaxWidth="428" MaxHeight="320" CodecPrivateData="250000010FCBCC0D509F8A0D5827E80C90808C4BE263400000010E5A67F840" />
            <QualityLevel Index="6" Bitrate="305000" FourCC="WVC1" MaxWidth="364" MaxHeight="272" CodecPrivateData="250000010FC3C80B50878A0B5821E80C9080894E4A76400000010E5A67F840" />
            <QualityLevel Index="7" Bitrate="230000" FourCC="WVC1" MaxWidth="364" MaxHeight="272" CodecPrivateData="250000010FC3C60B50878A0B5821E80C90800704704DC00000010E5A67F840" />
            <c t="0" />
            <c t="22350000" />
            <c t="42370000" />
            <c t="62390000" />
            <c t="82410000" d="20020000" />
        </StreamIndex>
        <StreamIndex Type="audio" Index="0" FourCC="WMAP" Chunks="5" QualityLevels="1" Url="QualityLevels({bitrate})/Fragments(audio={start time})">
            <QualityLevel Bitrate="192000" SamplingRate="44100" Channels="2" BitsPerSample="16" PacketSize="8917" AudioTag="354" CodecPrivateData="100003000000000000000000000000E0000000" />
            <c t="0" />
            <c t="22291156" />
            <c t="40867120" />
            <c t="60371882" />
            <c t="84056235" d="16718368" />
        </StreamIndex>
    </Clip>
    <Clip Url="http://abcxyz.com/sample2.ism/Manifest" ClipBegin="60000000" ClipEnd="160000000">
        <StreamIndex Type="video" Chunks="5" QualityLevels="8" MaxWidth="848" MaxHeight="476" DisplayWidth="848" DisplayHeight="476" Url="QualityLevels({bitrate})/Fragments(video={start time})">
            <QualityLevel Index="0" Bitrate="1644000" FourCC="WVC1" MaxWidth="848" MaxHeight="476"
```

```
CodecPrivateData="250000010FCBB21A70ED8A1A783B68045081B22B6457400000010
E5A67F840" />
        <QualityLevel Index="1" Bitrate="1241000" FourCC="WVC1"
MaxWidth="848" MaxHeight="476"
CodecPrivateData="250000010FCBA61A70ED8A1A783B68045081A5DECBBE400000010
E5A67F840" />
        <QualityLevel Index="2" Bitrate="937000" FourCC="WVC1"
MaxWidth="848" MaxHeight="476"
CodecPrivateData="250000010FCB9C1A70ED8A1A783B680450811C97F260C00000010
E5A67F840" />
        <QualityLevel Index="3" Bitrate="708000" FourCC="WVC1"
MaxWidth="568" MaxHeight="320"
CodecPrivateData="250000010FCB9611B09F8A11B827E8045081159AD66CC00000010
E5A67F840" />
        <QualityLevel Index="4" Bitrate="534000" FourCC="WVC1"
MaxWidth="568" MaxHeight="320"
CodecPrivateData="250000010FCB9011B09F8A11B827E8045081104B412F400000010
E5A67F840" />
        <QualityLevel Index="5" Bitrate="403000" FourCC="WVC1"
MaxWidth="568" MaxHeight="320"
CodecPrivateData="250000010FCB8C11B09F8A11B827E80450808C4BE263400000010
E5A67F840" />
        <QualityLevel Index="6" Bitrate="305000" FourCC="WVC1"
MaxWidth="480" MaxHeight="272"
CodecPrivateData="250000010FCB880EF0878A0EF821E8045080894E4A76400000010
E5A67F840" />
        <QualityLevel Index="7" Bitrate="230000" FourCC="WVC1"
MaxWidth="480" MaxHeight="272"
CodecPrivateData="250000010FCB860EF0878A0EF821E80450800704704DC00000010
E5A67F840" />
        <c t="60000000" />
        <c t="80000000" />
        <c t="100000000" />
        <c t="120000000" />
        <c t="140000000" d="20000000"/>
    </StreamIndex>
<StreamIndex Type="audio" Index="0" FourCC="WMAP" Chunks="6"
QualityLevels="1" Url="QualityLevels({bitrate})/Fragments(audio={start
time})">
        <QualityLevel Bitrate="192000" SamplingRate="44100" Channels="2"
BitsPerSample="16" PacketSize="8917" AudioTag="354"
CodecPrivateData="1000030000000000000000000000000E0000000" />
        <c t="42724716" />
        <c t="61082992" />
        <c t="80341043" />
        <c t="103096598" />
        <c t="120279365" />
        <c t="142570521" d="21362358" />
    </StreamIndex>
  </Clip>
</SmoothStreamingMedia>
```

A content producer can upload this manifest along with the original manifests and content (which may be already uploaded and available) to an HTTP accessible location. A client application sets its source to the URL of the composite manifest, and the client component handles playback of the composite media presentation. The following is an Extensible Application Markup Language (XAML) example for playing a composite media presentation using MICROSOFT™ SILVERLIGHT™.

```
<UserControl x:Class="SilverlightApplication6.MainPage"
    xmlns="http://schemas.microsoft.com/winfx/2006/xaml/presentation"
    xmlns:x="http://schemas.microsoft.com/winfx/2006/xaml"
        xmlns:SSME="clr-
namespace:Microsoft.Web.Media.SmoothStreaming;assembly=Microsoft.-
Web.Media.SmoothStreaming"
    xmlns:d="http://schemas.microsoft.com/expression/blend/2008"
xmlns:mc="http://schemas.openxmlformats.org/markup-
compatibility/2006"
    mc:Ignorable="d" d:DesignWidth="640" d:DesignHeight="480">
    <Grid x:Name="LayoutRoot">
        <SSME:SmoothStreamingMediaElement
```

```
SmoothStreamingSource="http://abcxyz.com/SampleRCEManifest.csm"
x:Name="SmoothPlayer" />
    </Grid>
</UserControl>
```

In some embodiments, the streaming composition system retrieves chunks earlier than the start of a particular clip to provide a playback system with sufficient starting information. For example, where a clip does not align well with a frame boundary or where chunks include intermediate frames, the stream composition system may identify a prior chunk that includes a key frame or other information for providing a suitable start of playback to the playback system. After providing the playback system with starting information, the streamlining composition system instructs the playback system to seek to the appropriate location identified by the clip. This allows the playback system to smoothly start playback at the specified clip boundary. The system may also expand the virtual timeline to include the first clip's last I-frame.

Using the above technique and others described herein, the streaming composition system can transition between clips that do not specify locations within a media stream that are at an I-frame boundary (i.e., the system does not require switching at an I-frame boundary). In addition, the system can perform near frame-level granularity transitions, where a frame from one clip is immediately followed by a subsequent frame from another clip.

In some embodiments, the streaming composition system uses the same audio encoding settings and video codecs across clips. By doing so, the system can avoid resetting any underlying hardware or playback system information upon transitioning from clip to clip. In addition, this can allow the system to drop new clip data into existing playback buffers and rely on the underlying playback system to seamlessly playback multiple clips.

In some embodiments, the streaming composition system handles redirects during playback. It is possible that either the composite manifest URL or any source server URL will refer to content that has been moved. Movements on web servers are often indicated by an HTTP 301 or 302 redirect response that indicates a new server. The streaming composition system may leave time during retrieval to allow sufficient time to handle any redirects and retrieve content from a new location.

In some embodiments, the streaming composition system leverages caching of the original clip sources. Because each chunk is an individually cacheable HTTP content item, caches may contain chunks for the original source media presentations. Because the composite manifest refers to clip chunks using the same URL as the original presentation, the system benefits from any existing caching of the source presentations. Thus, the system makes highlights quickly available to clients.

From the foregoing, it will be appreciated that specific embodiments of the streaming composition system have been described herein for purposes of illustration, but that various modifications may be made without deviating from the spirit and scope of the invention. Accordingly, the invention is not limited except as by the appended claims.

We claim:

1. A computer system for seamless playback of composite media, the system comprising:
    a processor and memory configured to execute software instructions, the instructions comprising the following components:
    a user interface component configured to provide an interface through which a content producer can select clips for inclusion in a composite media stream;
    a clip identification component configured to receive start and stop information about each of multiple clips to be included in the composite media stream; and
    a composite manifest component configured to create a composite manifest that describes the composite media stream, including an identification of each clip that comprises the composite media stream, each clip defines a start time and an end time of media content within a chunk that is to be played, each chunk being an individually addressable portion of media content that is cacheable by a network infrastructure, the composite manifest describes a plurality of chunks of media content forming the composite media presentation and an order for playback of the chucks based on the sequence of clips.

2. The system of claim 1 wherein the user interface component is further configured to allow the content producer to identify clips within a media presentation while an event is still in progress to create highlights or other relevant portions of the media presentation.

3. The system of claim 1 wherein the composite manifest component is further configured to store an extensible markup language (XML) file that hierarchically describes the clips that comprise the composite media stream.

4. The system of claim 1 wherein the composite manifest component is further configured to include one or more clip specifications at a frame level of accuracy.

5. The system of claim 1 further comprising,
    a source identification component configured to identify a source of the composite media stream, wherein the source provides the composite manifest.

6. The system of claim 1 further comprising,
    a manifest parsing component configured to retrieve the composite manifest, identify one or more clips specified within the composite manifest, and prepare the clips for playback.

7. The system of claim 1 further comprising,
    a virtual timeline component configured to build a virtual timeline that spans one or more clips specified by the composite manifest, wherein the virtual timeline has a total duration determined by adding up the length of all of the clips that make up the composite media stream.

8. The system of claim 1 further comprising,
    a playback component configured to play the composite media stream.

9. The system of claim 1, wherein at least one clip is part of a live presentation.

10. A device, comprising:
    at least one processor and a memory;
    the at least one processor configured to:
    provide an interface through which a content producer can identify media assets from which to compose clips from multiple different sources into a seamless composite media presentation;
    receive information identifying one or more clips for the composite media presentation;
    identify the one or more clips identified by the received information and storing information for playing each identified clips; and
    create a composite manifest that specifies information about the composite media presentation and each clip associated with the composite media presentation, each clip defines a start time and an end time of media content within a chunk that is to be played, each chunk being an individually addressable portion of media content that is cacheable by a network infrastructure, the composite manifest describes a plurality of chunks of media content forming the composite media presentation and an order for playback of the chucks based on the sequence of clips.

11. The device of claim 10 wherein receive information identifying one or more clips comprises receive selections of one or more previous presentations and identify start and stop times of one or more locations within the previous presentations from which to create clips.

12. The device of claim 10 wherein create the composite manifest comprises order clips so that a computer can play clip after clip as a single presentation to the user without seeking user input.

13. The device of claim 10, wherein at least one clip is part of an on-demand presentation.

14. The device of claim 10, wherein at least one clip is part of a live presentation.

* * * * *